J. A. WESENER.
APPARATUS FOR STORING, DILUTING, AND APPLYING BLEACHING AGENTS.
APPLICATION FILED MAY 14, 1908.

954,835.

Patented Apr. 12, 1910.
4 SHEETS—SHEET 1.

Witnesses:
John Endure
Chst H Buell

Inventor:
John A. Wesener.
By Robert Catherwood
Atty

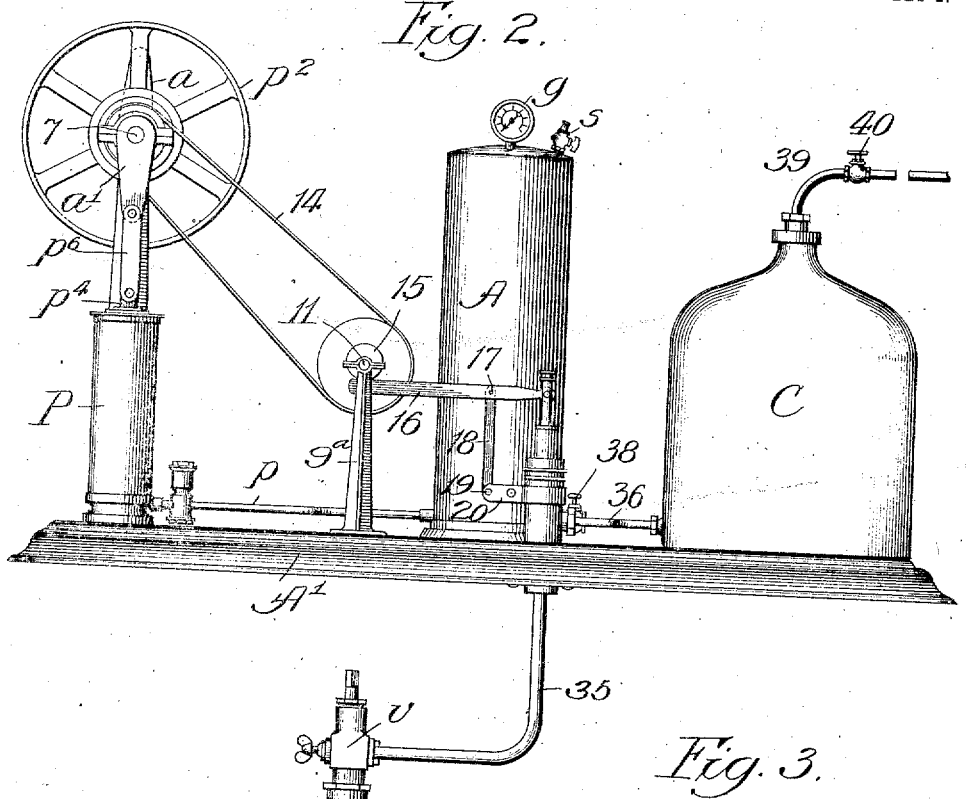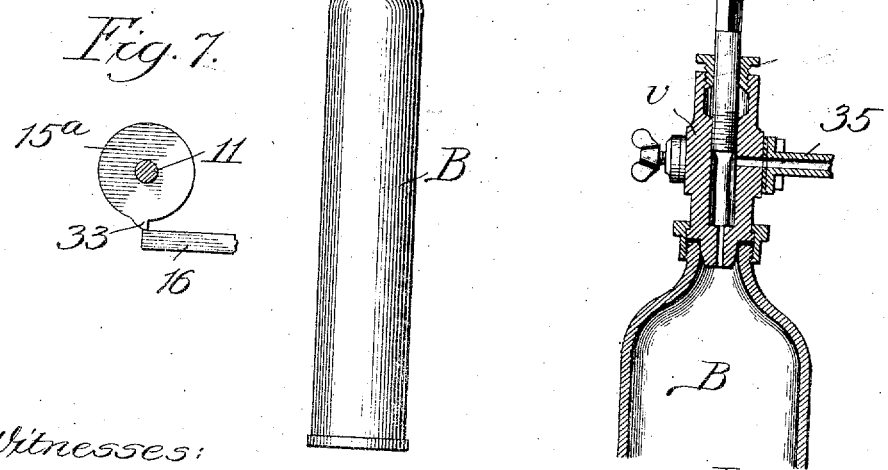

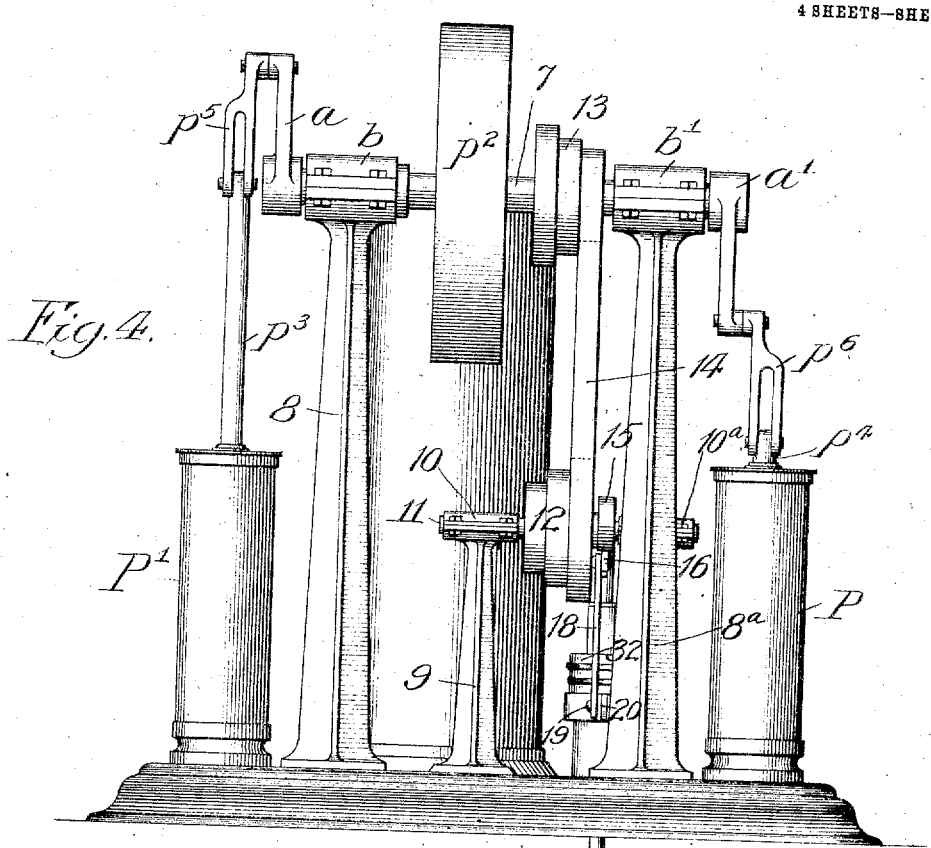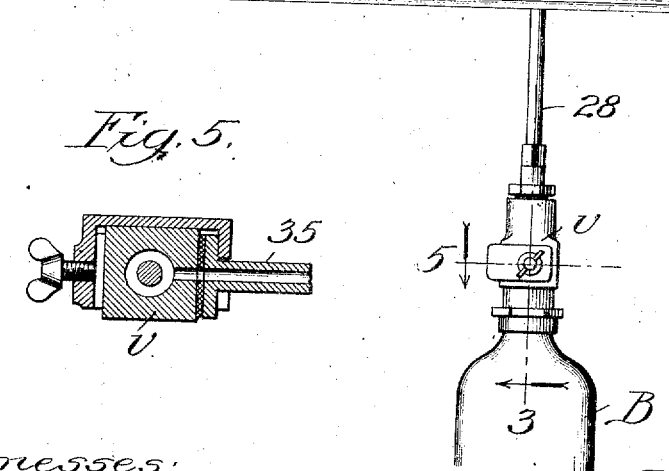

UNITED STATES PATENT OFFICE.

JOHN A. WESENER, OF CHICAGO, ILLINOIS.

APPARATUS FOR STORING, DILUTING, AND APPLYING BLEACHING AGENTS.

954,835.  Specification of Letters Patent.  Patented Apr. 12, 1910.

Application filed May 14, 1908. Serial No. 432,851.

*To all whom it may concern:*

Be it known that I, JOHN A. WESENER, a citizen of the United States, residing at Chicago, in the county of Cook and State of Illinois, have invented certain new and useful Improvements in Apparatus for Storing, Diluting, and Applying Bleaching Agents, of which the following is a specification, reference being had therein to the accompanying drawings.

My invention relates to apparatus for storing, diluting and applying nitrosyl-chlorid for aging and bleaching flour.

The primary object of the invention is to provide compact, simple, durable and economical apparatus of this character, easily moved from place to place, adapted automatically to mix nitrosyl-chlorid stored in detachable containers, capable of being separately sealed and removed for convenient handling, with air or other inactive gas or diluent, and to discharge the mixture in contact with flour, the apparatus having capacity for varying the relative proportions of the constituents as desired, for accurately and expeditiously measuring them in predetermined quantities and for maintaining the relative proportions of the constituents. The invention also contemplates constructing this apparatus in convenient form for treating different streams of flour in the agitator separately or from different points.

Figure 1:
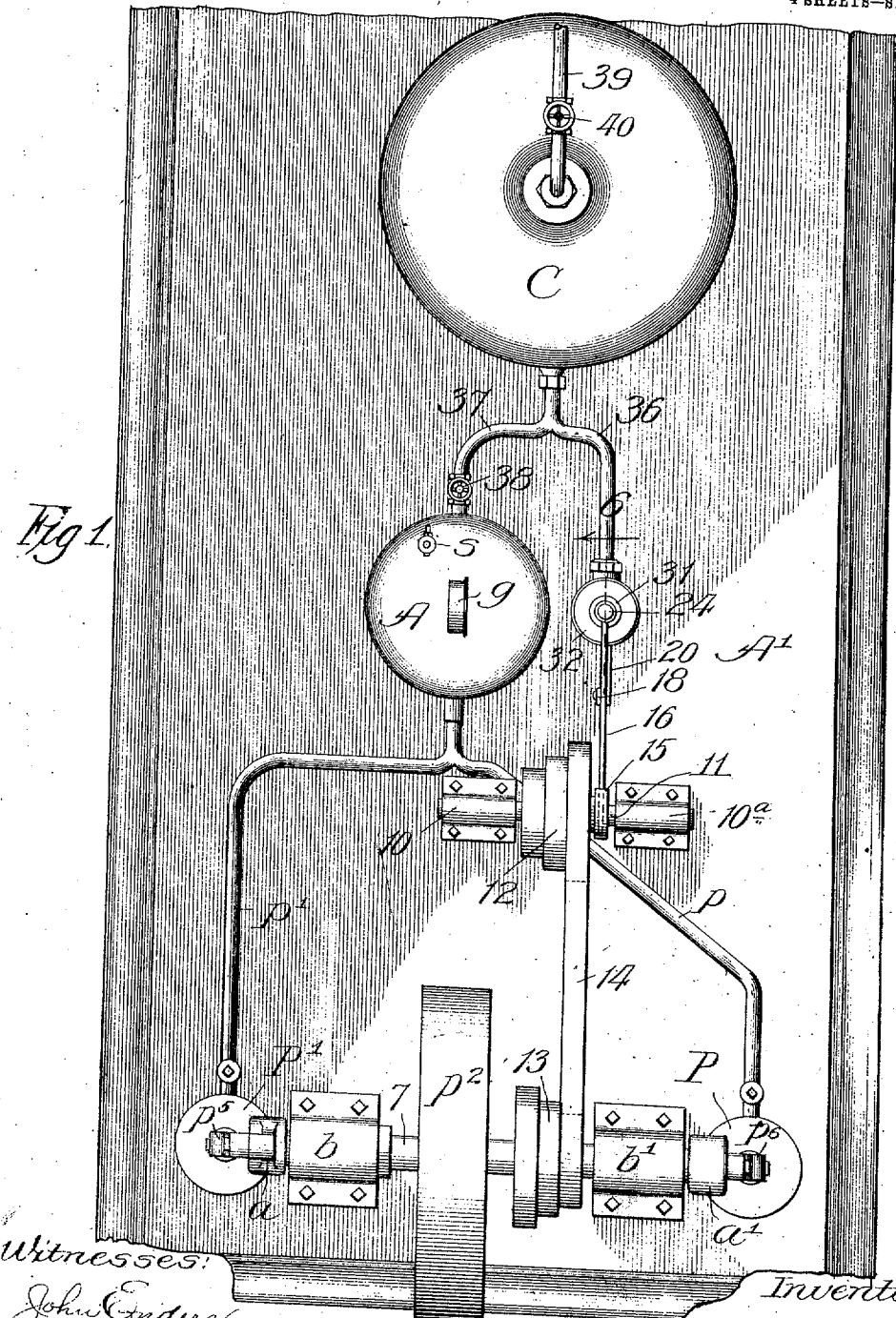
Figure 6:
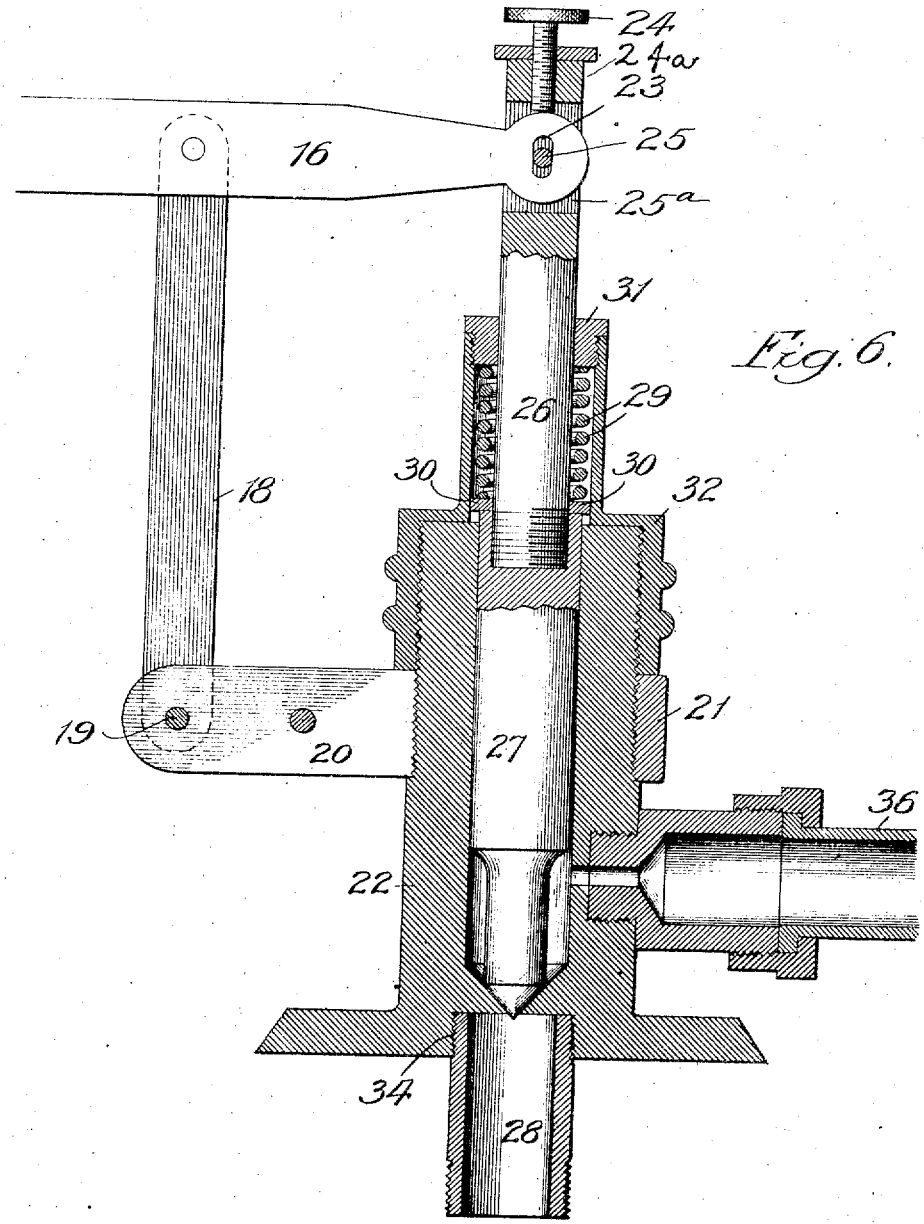

In the accompanying drawings, I have shown a device embodying my invention in one of its preferred forms, Figure 1 being a plan view, Fig. 2 a side elevation, Fig. 3 a vertical longitudinal section on line 3 of Fig. 4, Fig. 4 a rear end elevation, Fig. 5 a horizontal section on line 5 of Fig. 4, Fig. 6 an enlarged vertical longitudinal section on line 6 of Fig. 1, and Fig. 7 a modified form of eccentric and connection for expeditiously operating the needle valve.

In the drawings, A indicates a tank, mounted on a suitable base or frame $A'$, having a pressure gage $g$, a vent stop-cock $s$, of the well known construction for venting the tank. Into this tank A, air is pumped through a branch pipe $p$ by air pumps P, P' mounted on base $A'$ and driven by pulley $p^2$ on shaft 7 in bearings $b$ and $b'$, supported on uprights 8, $8^a$ on base $A'$. The pulley is connected to power and the pistons $p^3$ $p^4$ are driven from the shaft 7 in alternate stroke relation by arms $a$ $a'$, extending in opposite directions, and pitmen $p^5$ $p^6$ secured to the outer end of each piston respectively. The pumps are constructed in the usual manner and need not be more fully described. Mounted on the base $A'$ on supports 9, $9^a$ in bearings 10, $10^a$ is shaft 11, carrying cone pulley 12 diminishing in diameter from right to left, while on shaft 7 in alinement with pulley 12 is a similar cone pulley 13 diminishing in diameter from left to right. Pulley 12 is driven from pulley 13 by belt 14, which may be shifted from side to side on said cones to vary the relative speeds of the shafts as desired.

Mounted on shaft 11 is an eccentric 15, adapted intermittently to depress one end of the lever 16 and thereby operate the valve controlling the supply of the bleaching agent. This lever is preferably pivoted intermediate of its ends at 17 to an upright 18 rigidly supported at 19 on ears 20 of collar 21 encircling valve chamber 22. The opposite end of this lever is slotted at 23 and adjustably secured by means of a set screw 24 and a pin 25 in slot $25^a$ securely held by lock nut $24^a$ on one end of a longitudinally movable valve stem 26 in chamber 22. To the opposite end of this stem is secured valve 27. Longitudinal motion of valve stem 26 is adapted to open and close valve 27 and open and close communication between the chamber 22 and a pipe 28, the valve being normally held closed on its seat by a spring 29 pressing against shoulders 30 of valve 27 and the under side of a cap 31 threaded and screwed on thimble top 32, which in turn is threaded and screwed on valve box 22. By this construction the entire valve may be thus removed when desired. The size of the valve opening may be varied or adjusted by adjusting set screw 24. Rocking lever 16 will open valve 27 and release thereof will permit spring 29 to instantaneously close it.

In Fig. 7, I have shown an alternative means of rocking lever 16 viz. a disk $15^a$ mounted on shaft 11, in lieu of eccentric 15, and provided on its circumference with one or more lugs 33 positioned to rock the lever 16 intermittently as the disk revolves. This modified construction is designed to open the valve 27 very quickly to admit only small quantities of the agent. Pipe 28 is threaded at one end and secured to valve box 22 by threads 34, so that it may be detached therefrom, while to the opposite end is similarly attached a pipe 35 of a container B provided with any suitable form of adjustable shut off valve $v$. The container and valve ther to being well known in the art need not be more particularly described. They are adapted to hold nitrosyl-chlorid or analogous liquefied bleaching agents at vaporizing temperatures.

Leading from valve chamber 22 is a pipe 36, having a branch 37 under control of a valve 38, leading from the tank A. This pipe may be used as a mixing or diluting conduit for the diluent and the agents and to apply the mixture directly upon the flour, but I prefer to add as a supplemental chamber a glass diluting and mixing chamber C, provided with a discharge pipe 39, controlled by a valve 40. I prefer to line the interiors exposed to nitrosyl-chlorid with pottery porcelain or glass.

The operation of my preferred device is as follows: A container B, previously charged with nitrosyl-chlorid is attached to pipe 28. Valve 27 is then adjusted to admit a definite predetermined quantity of the bleaching agent at each operation of the lever 16, by turning set screw 24 and timing the stroke by shifting belt 14 on cones 12 and 13 to desired position. Power is then applied to pulley $p^2$ and the feed of air or diluting agent into chamber C regulated by adjusting valve 38. A steady flow of air is thus forced into C while an intermittent measured flow of the bleaching agent, bearing a definite proportional relation to the stream of air is driven into this chamber by the charged container through valve 27. There the constituents mix and are discharged into contact with the flour through pipe 39 when valve 40 is opened.

I am aware that many modifications of the device shown and described will suggest themselves to those skilled in the art, and I do not wish to limit myself thereto, but what I claim is:

1. In flour bleaching apparatus, a diluting and mixing conduit, automatic means for forcing diluent therethrough, a pipe opening into said conduit, a self closing valve therein, means for supplying gaseous flour bleach at a pressure greater than the pressure of said diluent and mechanism, operated by said automatic means, for opening said valve a distance sufficient to admit through said pipe gaseous flour bleach under pressure greater than the pressure of the diluent in said conduit, and bearing a constant proportional relation thereto.

2. In flour bleaching apparatus, a conduit, automatic means for forcing diluent therethrough, a pipe opening into said conduit having a self closing valve therein, means for supplying flour bleaching gas at a pressure greater than the pressure of said diluent, and mechanism operated by said automatic means for opening said valve a distance sufficient to admit through said pipe flour bleaching gas under pressure in excess of the pressure of diluent in said conduit, bearing a proportional relation thereto, said mechanism being adjustable to vary said relative proportions for the purposes described.

3. In flour bleaching apparatus, a diluting and mixing conduit, automatic means for supplying diluent thereto, a pipe opening into said conduit, the outer end of which is adapted to be connected to removable containers charged with liquefied vaporizing bleaching agents, a self closing supply valve in said pipe, and mechanism, intermittently operated by said automatic means, for opening said supply valve at regular intervals to admit into said chamber predetermined quantities of said agents, said mechanism being adjustable to vary said intervals and quantities, whereby said bleaching agents and diluents are mixed in predetermined relative proportions and delivered for the purposes described.

4. In flour bleaching apparatus, a diluting and mixing chamber having a valve controlled discharge, automatic means for supplying diluent thereto, a conduit opening into said chamber, the outer end of which is adapted to be connected to removable containers charged with bleaching agents under pressure in excess of the pressure in said chamber, a self closing valve in said conduit, and mechanism, intermittently operated by said automatic means, for opening said supply valve at regular intervals to admit into said chamber predetermined measured quantities of said agents, whereby a constant proportional relation is maintained in mixing said diluent and said agents.

5. In flour bleaching apparatus, a conduit having a self closing valve therein, automatic means for pumping therethrough, and automatic means for opening said valve intermittently at intervals a regular and predetermined distance, both said automatic means being coördinated to admit through said conduit fixed relative proportions of diluent and liquefied nitrosyl chlorid, and delivery means for said mixture.

6. In combination with a diluting and mixing chamber, having a discharge opening, automatic means for supplying diluent to said chamber, a container charged with a liquefied bleaching agent at vaporizing temperatures, a conduit connecting said container and chamber, having a valve therein, adjustable means, intermittently operated by said automatic means, for opening said valve to admit to said chamber at regular intervals predetermined measured quantities of said bleaching agent, and a spring adapted normally to close said valve, whereby said agent and diluent are mixed in definite proportions variable at will and discharged from said chamber.

7. In flour bleaching apparatus, a drive shaft, a driven shaft parallel thereto, a pair of cone pulleys, one on each shaft in alinement with the other diminishing in diameter from opposite sides, a belt adapted to connect said pulleys, an air pump operated by said drive shaft to supply air through a conduit, a conduit, a pipe opening therein, a self closing valve in said pipe, a lever connected at one end to the stem of said valve, an eccentric on said driven shaft adapted intermittently to rock said valve, means for delivering flour bleaching gas under pressure through said pipe, whereby said gas is diluted in measured quantities and delivered through said conduit into intimate contact with flour.

8. The combination of a drive shaft, a driven shaft parallel thereto, a pair of cone pulleys, one on each shaft in alinement with the other diminishing in diameter from opposite sides, a belt adapted to connect said pulleys, an air pump operated by said drive shaft to supply air through a conduit, a conduit, a pipe opening therein, a self closing valve in said pipe, a lever connected at one end to the stem of said valve, means on said driven shaft adapted intermittently to rock said lever to open said valve, means for forcing flour bleaching agent through said pipe and valve into said conduit, and delivery means for said mixture.

9. In flour bleaching apparatus, a conduit having an opening adapted to be directed upon a stream of flour, automatic means for forcing air therethrough, a pipe opening at one end into said conduit and controlled by a self closing valve, a self closing valve longitudinally movable to and from its seat, the outer end of its stem being recessed, a pivoted lever having one end slotted and secured within said recess to said stem by an adjusting screw, means operated by said automatic means for rocking said lever to open said valve to adjust the distance said valve is opened, and means for forcing gaseous flour bleaching agents through said pipe, valve and conduit and delivery means for said mixture.

10. In flour bleaching apparatus, a conduit having an opening adapted to be directed upon a stream of flour, automatic means for forcing air therethrough, a pipe opening at one end into said conduit, the other end being adapted to receive gaseous flour bleaching agents under pressure greater than that in said conduit, a self closing valve controlling said pipe, a pivoted lever operated alternately to open and close said valve, means for adjusting the stroke of said valve, a lever and mechanism operated by said automatic means to rock said lever to open said valve.

11. In flour bleaching apparatus, a conduit having an opening adapted to be directed upon a stream of flour, a container charged with a bleaching agent vaporizing at ordinary temperatures, a pipe connecting said chamber and container, having a longitudinally movable valve therein, a lever with one end secured to the stem of said valve, pivoted intermediate of its ends, rotating means for intermittently operating said lever to open said valve and a spring adapted to instantaneously close the same, substantially as described.

In testimony whereof I hereunto affix my signature in the presence of two witnesses.

JOHN A. WESENER.

Witnesses:
ROBERT CATHERWOOD,
HENRY C. MORRIS.